Jan. 28, 1969  E. BREETVELT  3,424,045

SHEARING MACHINE FOR PLATES

Filed April 13, 1967

United States Patent Office 3,424,045
Patented Jan. 28, 1969

3,424,045
SHEARING MACHINE FOR PLATES
Emile Breetvelt, 17 Queen's Road, Parktown, Johannesburg, Transvaal, Republic of South Africa
Filed Apr. 13, 1967, Ser. No. 630,660
Claims priority, application Republic of South Africa,
Apr. 19, 1966, 66/2,252
U.S. Cl. 83—373                5 Claims
Int. Cl. B26d 5/08, 1/08

ABSTRACT OF THE DISCLOSURE

The invention relates to plate shearing machines whereby a minimum deformation of the cut plate occurs. This is effected by the moving blade being positioned in the upper edge of a slot of adjustable width in a robust beam such that the cut edge of the sheet must always be supported against bending.

---

This invention relates to machines for shearing metal plates and is particularly suitable for shearing heavy steel plates.

Plates of the type above referred to are generally sheared or cut to required sizes in guillotines having a pair of blades which reciprocate in a vertical direction relative to each other and with a slight inclination to the horizontal of the moving blade. This enables a plate to be cut progressively from one edge to the other. The same effect has been obtained by using a pair of blades pivotally connected either within or without the length of the blades to obtain a single or double scissor-like action. The former type of machine involves a long stroke and, relative to the latter, a more robust type of construction since there is no balancing of the forces exerted on the plates as is obtained in the latter type of machine.

It has now been found that the cuts obtained from all these machines result in a bending and twisting of the plate under the moving blade or blades, and previous endeavours to overcome this difficulty have not shown economical advantage.

The object of this invention is to provide a shearing machine for metal plates in which the shearing blades are pivoted together at one end and generally beyond the length of the shearing blades and also out of line with their shearing edge and to cut with a scissors-like action throughout their entire length if necessary.

According to this invention there is provided a metal plate shearing machine comprising a stand supporting a rigid table with a single blade in one edge, a rigid beam pivotally supported in the stand beyond the length of the blade to reciprocate against the blade, a normally horizontal slot through the beam, a single blade in the beam forming the upper part of the slot opposed to the blade in the stand and means for reciprocating the beam about its pivot against the blade in the table edge.

Further features of this invention provide for the height of the slot through the beam to be adjustable, for the beam to have supporting platforms above and below the slot projecting in a direction opposite to the table and for the stand to carry guides for the beam to hold the latter against the knife in the table edge.

The invention also provides for the blades to be replaceable and for reciprocation of the beam and adjustment of slot width to be effected by means of hydraulic cylinders.

Figure 1:
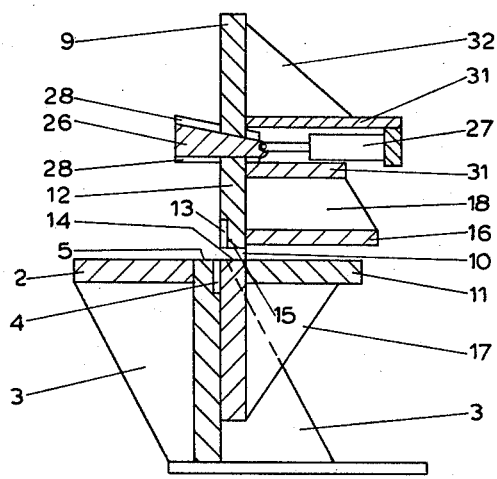
Figure 2:
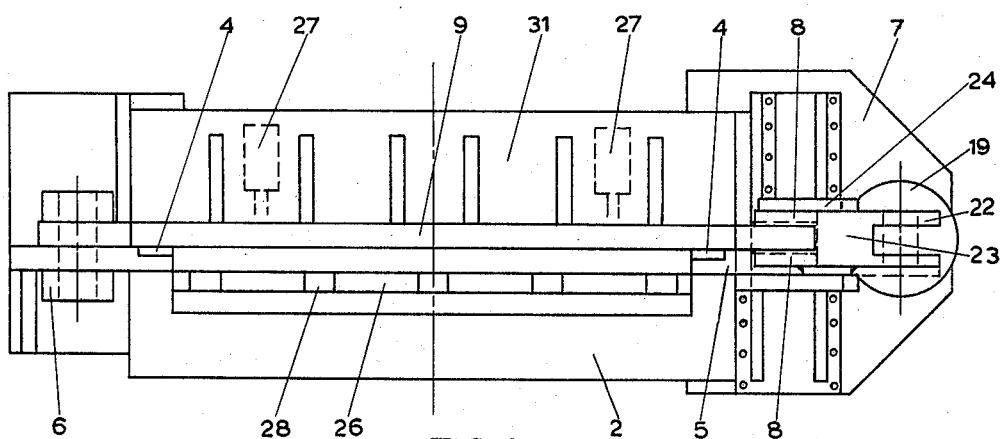
Figure 3:
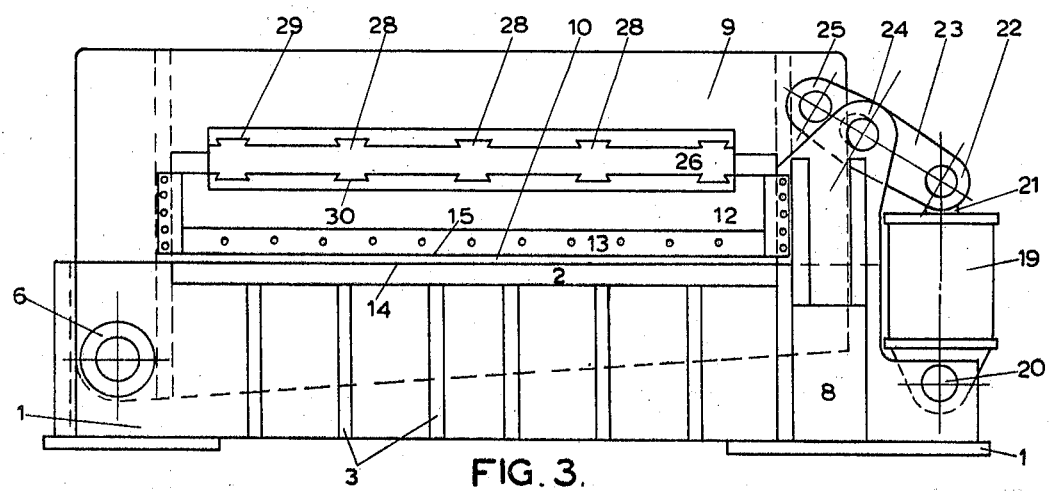

A preferred form of this invention will be described with reference to the accompanying diagrammatic drawings in which:

FIG. 1 shows a cross-sectional end elevation,
FIG. 2 a plan, and
FIG. 3 an elevation of the shearing machine.

As shown the shearing machine consists of a solid stand 1 supporting a rigid table 2 which is braced by suitable gussets 3. A cutting blade 4 is mounted along part of the upper edge 5 of the table 2 and this blade will be replaceable in any conventional and convenient manner.

The stand 1 provides a pivot mounting 6 near one end thereof and this mounting 6 is located outside of and below the length of the blade 4. This is preferable since it leads to definte economic advantages in the construction of a practical machine but it is not essential to the effective operation of a machine within the scope of this invention.

At the end 7 of the stand opposite to the mounting 6 a robust vertical guide 8 is provided to accommodate the end, or a formation on the end, of a robust beam 9. This beam 9 is pivotally supported at one end on the mounting 6 and constrained in the guide 8.

The beam 9 in the normal position has a slot 10 therethrough, the outer lower edge thereof being extended to form a second table 11. The beam has an adjustable panel 12 which panel carries the second cutting blade 13 in the lower edge thereof and is positioned in opposed relation to the fixed blade 4. The blade 13 is also replaceable in a manner similar to blade 4.

The maximum width of slot 10 is such that it will receive with a small clearance the maximum thickness of plate to be cut by the machine.

It will be appreciated that if the beam 9 is rotated in a downward direction about the pivot mounting 6 the end of beam 9 remote therefrom will move faster than that adjacent the mounting 6. Thus a plate laid on the table 2 and through slot 10 will be cut from end 7 of the stand towards the pivot mounting 6. This would normally result, with conventional shearing machines, in the downward and outward twisting of the edge of the cut plate. However the lower wall 14 of slot 10 in beam 9 prevents any such relative movement of the cut plate which is also supported on the second table 11. Deformation in reaction to the support provided by the lower wall 14 of slot 10 and table 11 is prevented by the upper wall 15 of the slot carrying blade 13 and a fixed guide plate 16.

Gussets 17 and 18 will be provided to support the table 11 and guide plate 16 which are integral with beam 9 and panel 12 respectively.

To provide the necessary reciprocatory movement of the blade 13 relative to blade 4 a robust vertical hydraulic piston and cylinder assembly 19 is mounted on stand 1 at end 7 remote from the pivot mounting 6. The lower support 20 for assembly 19 allows a small amount of rotation of the assembly 19. The upper end of piston rod 21 of assembly 19 is pivotally connected to one bifurcated end 22 of link 23. The central portion of link 23 is pivotally mounted in lugs 24 projecting from the guide 8. The other bifurcated end 25 of link 23 is pivotally connected to the free end of beam 9 which is therefore constrained by this linkage as well as by guide 8.

From the above description it will be appreciated that with the piston and cylinder assembly 19 in the retracted position the slot 10 will be such that the lower wall 14 will be on the same horizontal plane as the edge of blade 4. Extension of the piston rod 21 will result in a downward tipping of beam 9 to give the cutting action above referred to. This causes a uniform tipping of beam 9 and the cut portion of a plate in the machine and the cut portion is maintained in its original relation to the slot 10 thus preventing any bending or twisting of the cut plate.

It will be appreciated that this effect results in an appreciable saving in the subsequent treatment of the cut plate since no straightening process is required. The usual forms of guillotine all require a subsequent straightening of the plate before welding or other similar fabrications can be effected.

Normally, where the machine is designed to cut plates of ½″ in thickness, it is found that a small degree of twisting does take place where plates of thinner dimension, said 1/16″–1/8″ are cut. This distortion, while never approaching that obtained with conventional machines, is nevertheless undesirable and to obviate this disadvantage the panel 12 is provided in the beam 9. Groove and tongue or other conventional arrangements may be used to maintain the panel 12 in the plane of beam 9 and the blade 13 is carried on the lower end of the panel 12.

Adjustment of the panel 12 relative to beam 9 is preferably effected through a wedge 26 running along the major portion of the cutting blade and controlled through one or more subsidiary hydraulic piston and cylinder assemblies 27.

To ensure that the movement of wedge 26 under the action of assemblies 27 is effective in both directions the wedge has dovetail formations 28 formed thereon. Correspondingly shaped sockets 29, 30 are formed in beam 9 and panel 12.

It will be appreciated that the contacting surfaces of the wedge 26 with the panel 12 and beam 9 are accurately machined to resist the forces necessary to cut the maximum thickness of plate for which the machine is designed.

As shown in FIG. 1 the piston and cylinder assemblies 27 are held in fabricated formations 31 carried by the beam 9 and further supporting gussets 32 are provided to ensure that these arrangements are sufficiently strong for their purposes.

From the above it will be readily understood that many modifications can be made to the particular embodiment above set forth without departing from the scope of the invention provided only that at least the edge of the cut plate is supported on both sides throughout the cutting operation. For example eccentrics may be used to vary the position of the panel 12 relative to the beam 9 and also wedge acting longitudinal of the panel will give the desired result.

Other alternative constructions include pneumatic or mechanical power operation and different locations of the pivot mounting 6 outside of the length of cut of the blades 4 and 13. Any location of the pivot other than outside of the length of cut has been found, in spite of known precautions being taken, to result in a double twist and bend on both edges of the cut piece of plate.

Actual dimensions and strength of materials of particular machines will be determined by the requirements which the machine is to meet and are well within the inherent abilities of those skilled in the art.

What I claim as new and desire to secure by Letters Patent is:

1. A metal plate shearing machine comprising a stand supporting a rigid table with a single blade in one edge, a rigid beam pivotally supported in the stand beyond the length of the blade to reciprocate against the blade, a normally horizontal slot through the beam, a single blade in the beam forming the upper part of the slot opposed to the blade in the stand and means for reciprocating the beam about its pivot against the blade in the table edge.

2. A metal plate shearing machine as claimed in claim 1 in which the height of the slot in the beam is adjustable.

3. A metal plate shearing machine as claimed in claim 1 in which the beam is pivotally supported in the stand around a point located below the level of the blade fixed in the stand.

4. A metal plate shearing machine as claimed in claim 1 in which supporting platforms are provided above and below the slot through the beam.

5. A metal plate shearing machine as claimed in claim 1 in which the beam is reciprocable and the slot height adjustable by means of hydraulic piston and cylinder assemblies.

References Cited

UNITED STATES PATENTS

| | | | |
|---|---|---|---|
| Re. 11,098 | 7/1890 | Stolpe | 83—197 X |
| 1,497,676 | 6/1924 | Fink | 83—580 |
| 1,925,915 | 9/1933 | Allsworth | 83—373 X |
| 3,213,732 | 10/1965 | Breetvelt | 83—199 X |

DONALD R. SCHRAN, *Primary Examiner.*

F. T. YOST, *Assistant Examiner.*

U.S. Cl. X. R.

83—580, 605, 608, 694